March 16, 1943.   C. G. ANDERSON ET AL   2,314,063
APPARATUS FOR TESTING GOLF BALLS
Filed Aug. 31, 1940   4 Sheets-Sheet 1
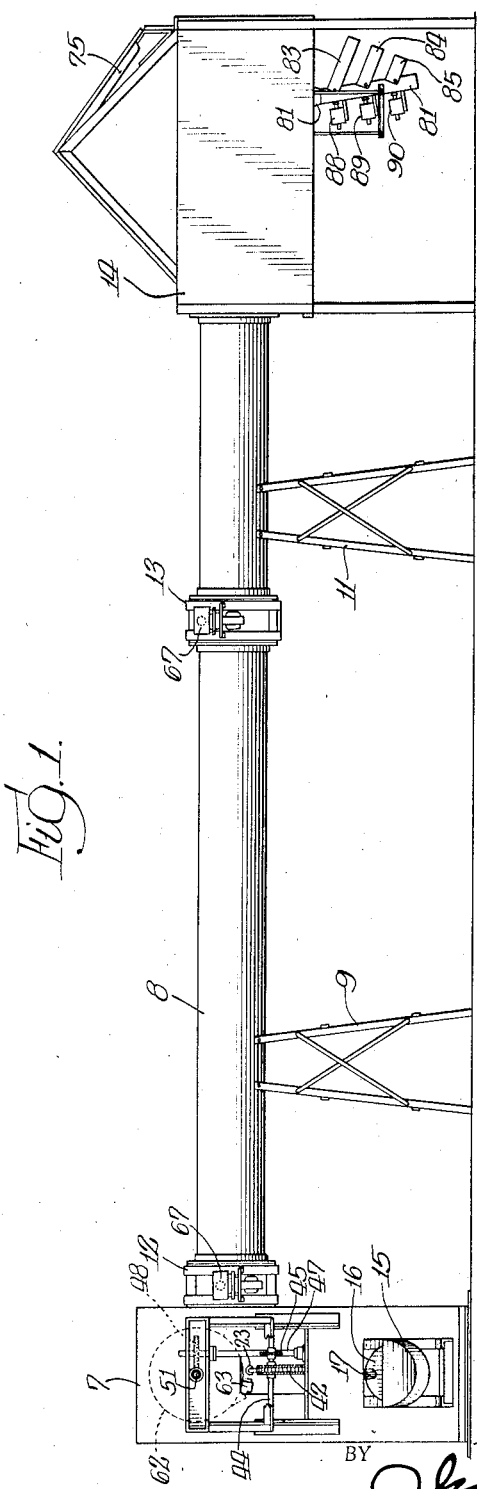
Inventors:-
Carl G. Anderson,
Donald E. Richardson,
BY Ira J. Wilson Atty.

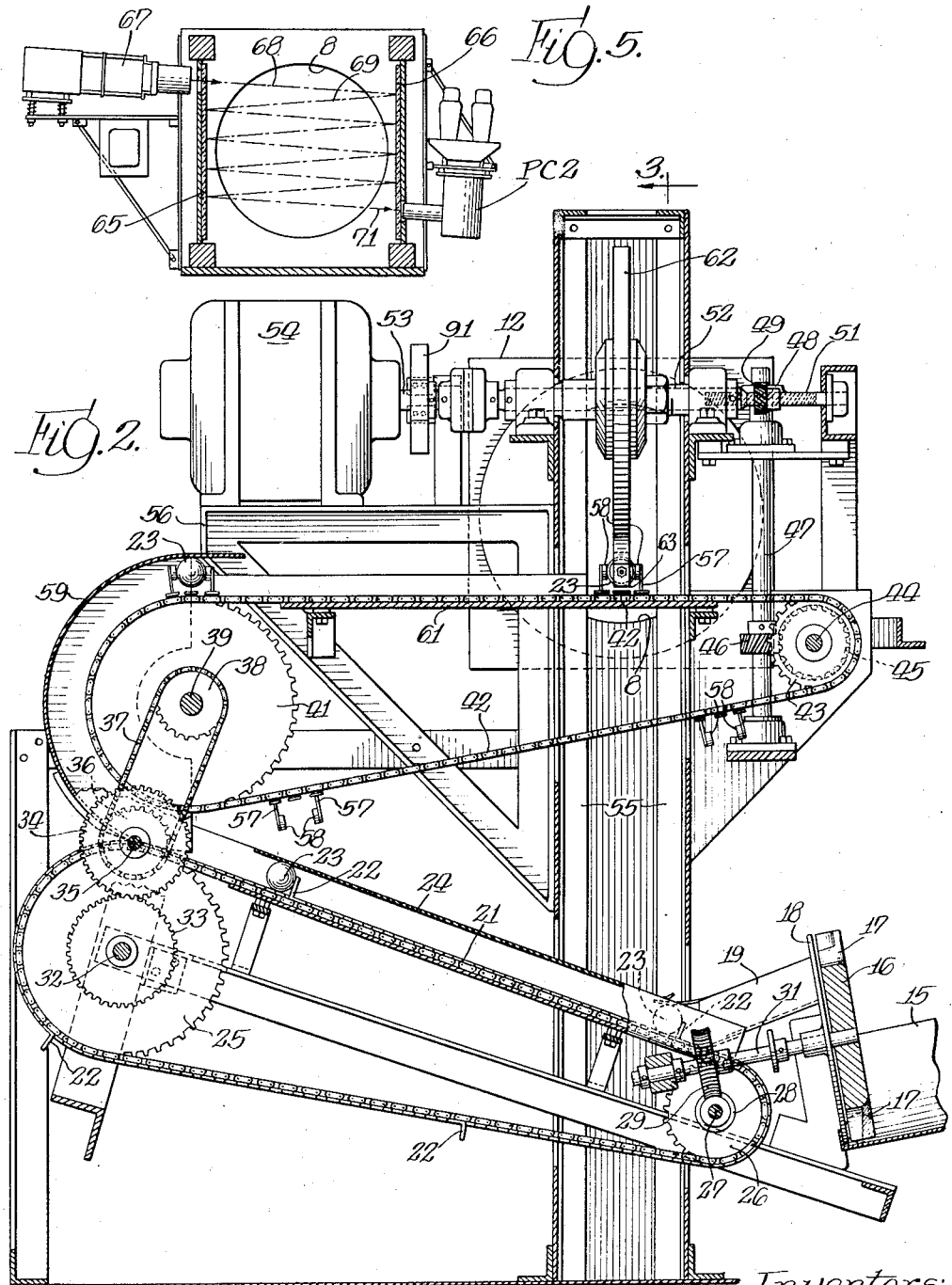

March 16, 1943.     C. G. ANDERSON ET AL     2,314,063
APPARATUS FOR TESTING GOLF BALLS
Filed Aug. 31, 1940     4 Sheets-Sheet 3
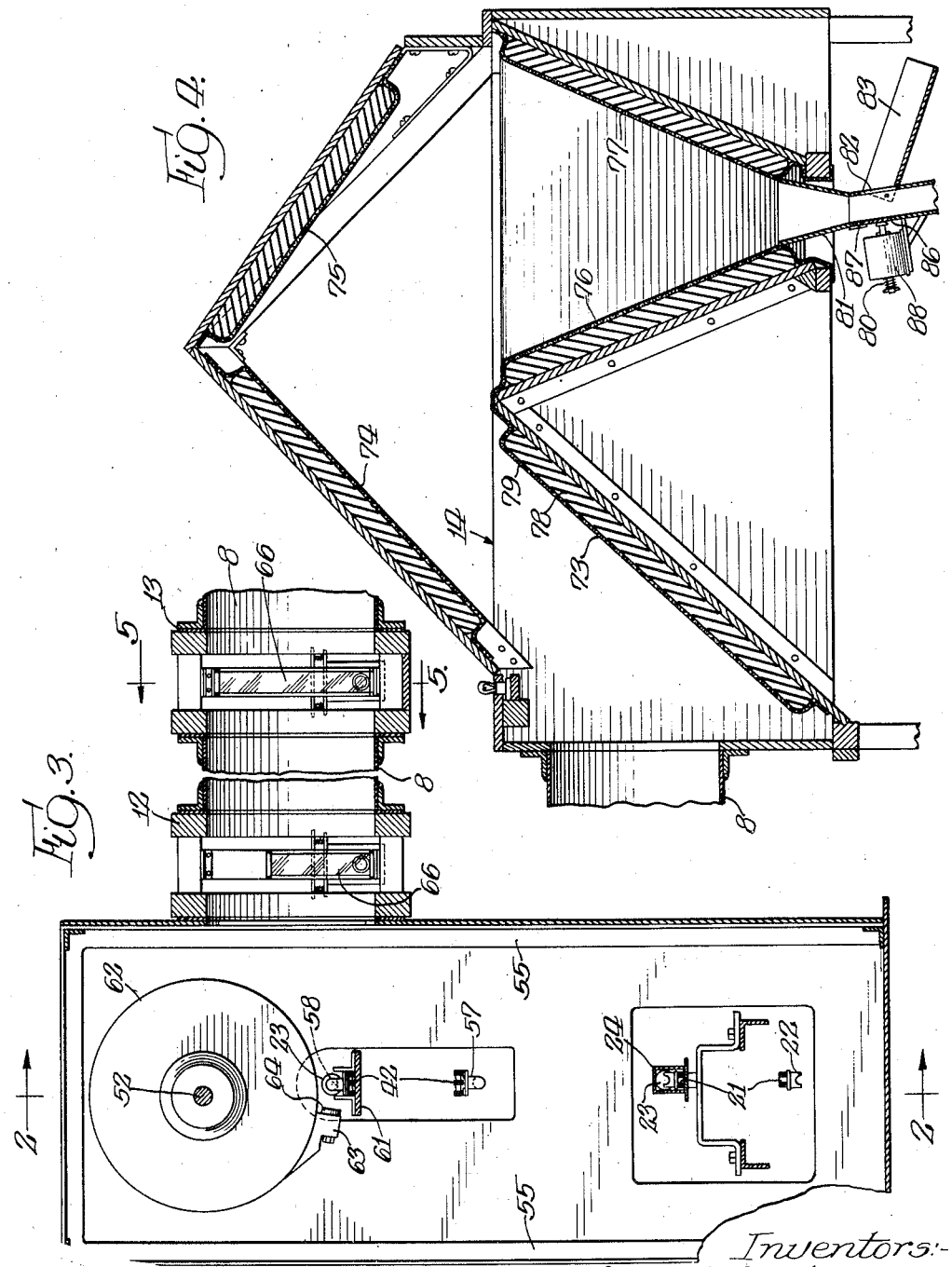
Inventors:-
Carl G. Anderson,
Donald E. Richardson,
BY Ira J. Wilson Atty.

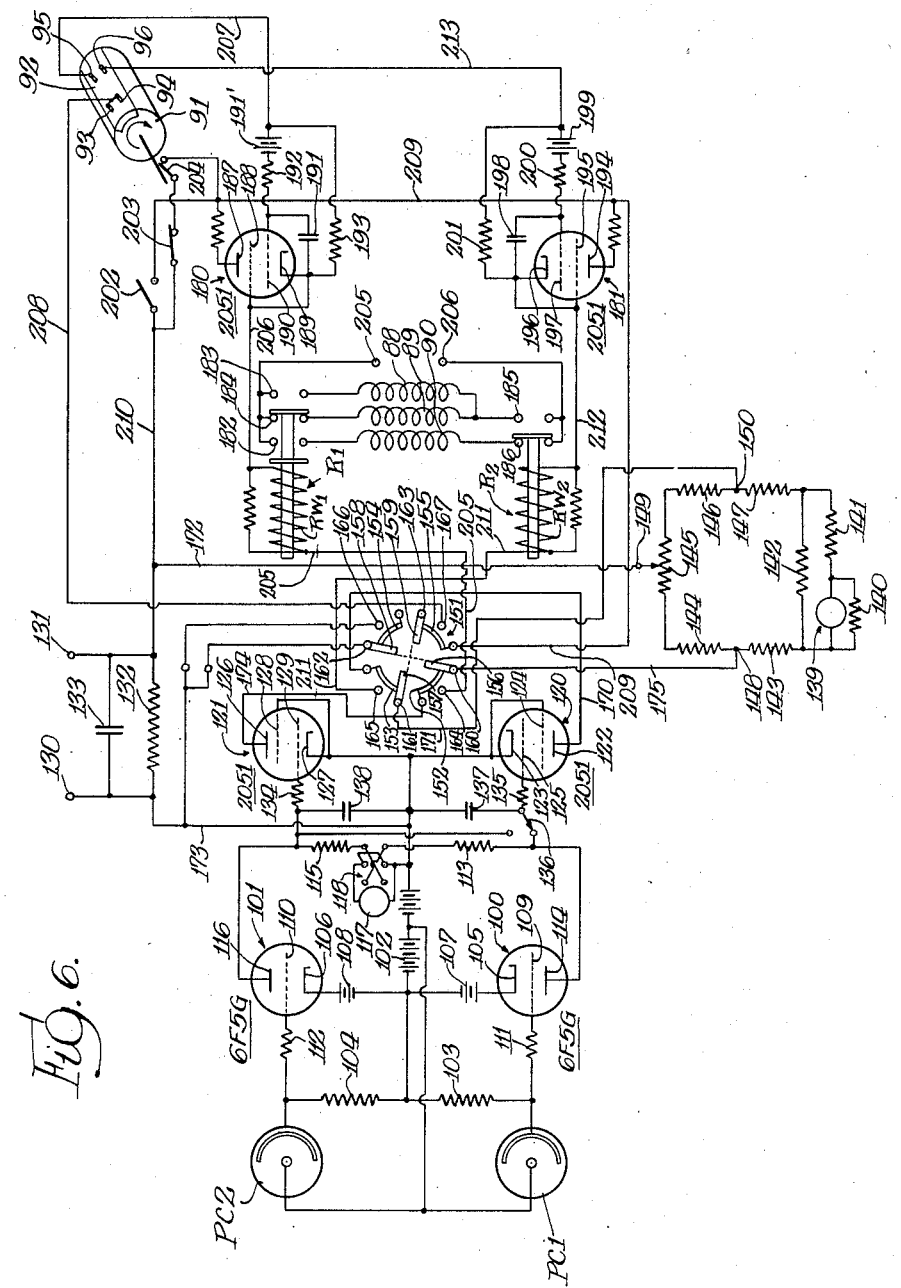

Patented Mar. 16, 1943

2,314,063

UNITED STATES PATENT OFFICE 2,314,063

APPARATUS FOR TESTING GOLF BALLS

Carl G. Anderson and Donald E. Richardson, Chicago, Ill., assignors to United States Golf Association, a voluntary association Application August 31, 1940, Serial No. 355,012

9 Claims. (Cl. 209—120)

This invention relates in general to apparatus for comparatively testing or determining the velocities of moving objects. While the principles of our invention are capable of employment in apparatuses for testing or determining the velocities of various objects, the embodiment of the invention here illustrated and described is designed and particularly suitable for testing or determining the velocities of golf balls.

It is desirable that golf balls, particularly those used in tournament play, be substantially uniform not only in size and weight, but also in resiliency which to a large degree determines their velocities and length of flight.

The primary object of our present invention is to provide an apparatus by which the initial velocities of driven golf balls may be determined, and by which such balls may be segregated into groups corresponding with their respective coefficients of resiliency.

This object is attained by hitting each ball with a mass moving at a constant speed and measuring the resultant velocity with which the ball leaves the driving face. The initial velocity of a ball so driven indicates its inherent capability of flight and its expected distance of travel, except as modified by wind and atmospheric conditions.

Another object of our invention is to provide means for accurately locating a series of golf balls in succession in a predetermined position in the path of the continuously operating driver moving at a constant speed, so that each ball will be accurately hit by the driver at the same point on its surface.

Another purpose of our invention is to provide means operable by the driven balls in flight, whereby the actual linear velocity of any ball may be determined when desired and whereby a series of driven balls may be segregated or classified into groups of like or similar velocities.

A further object is to provide an apparatus for determining the velocity of a ball during its first few feet of flight, thereby eliminating the factors of wind and atmospheric conditions which materially affect the length of flight.

Another object is to provide an apparatus which will be compact and therefore capable of use indoors, and one which will be accurate, reliable and durable in use.

Other desirable features and inherent advantages of our invention will be readily appreciated as the same becomes better understood by reference to the following description when considered in connection with the accompanying drawings.

Referring to the drawings,

Fig. 1 is a side elevation of an apparatus embodying our invention;

Fig. 2 is a transverse sectional view taken on the line 2—2 of Fig. 3;

Fig. 3 is a longitudinal sectional view of the driving end of the machine taken on the line 3—3 of Fig. 2;

Fig. 4 is a similar view forming a continuation of Fig. 3;

Fig. 5 is a sectional view on the line 5—5 of Fig. 3; and

Fig. 6 is a wiring diagram of the electric circuits employed in the apparatus.

Referring to the drawings more in detail, and particularly to Fig. 1, reference character 7 indicates the mechanism which positions and drives the balls through the tube or conduit 8 carried upon the supports 9 and 11. Light sensitive elements are located at stations 12 and 13, one at the entrance end of the tube 8 and the other about ten feet further along the tube. From the tube the balls are delivered into the velocity dissipator 14 from which they are discharged and diverted into selected groups by electrically operating diverting switches, which will be later described.

The mechanism for positioning and driving the balls, illustrated in Figs. 1, 2, and 3, is provided at one side near the bottom with an inclined hopper 15 adapted to receive the balls to be tested. From this hopper the balls are carried singly and in succession by a rotating disk 16 provided with a plurality of pockets 17 to an upper position in alignment with an opening in a plate 18 through which the balls roll by gravity down a chute 19 onto the upper surface of an endless belt conveyor 21 equipped at regularly spaced intervals with feeding dogs or lugs 22. Each dog moves a ball 23 in front of it in an upwardly inclined direction, the balls being retained against displacement from the conveyor by a guide or shield 24 of inverted channel shape, as shown in Fig. 3.

The conveyor 21 is trained around and driven by a sprocket wheel 25 and is also trained around a lower sprocket wheel 26 mounted on a shaft 27 provided with a worm 28 meshing with a worm wheel 29 on the shaft 31 which carries the ball feeding disk 16. By this train of mechanism, the feeding disk is driven from the conveyor.

The conveyor sprocket wheel 25 is mounted on a shaft 32 upon which is also mounted a gear wheel 33 meshing with and driven by a pinion 34 carried by a shaft 35, which also carries a sprocket wheel 36 driven by a chain 37 from a driving sprocket wheel 38 fixed on shaft 39. A large sprocket wheel 41 also fixed on this shaft has trained around it a sprocket chain 42 driven from a driving sprocket wheel 43 fixed on a shaft 44. A worm wheel 45 also fixed on shaft 44 is driven by a worm 46 mounted on a vertical shaft 47 equipped near its upper end with a worm wheel 48 meshing with and driven by a worm 49 on the driven shaft 51, which is directly connected through the driver shaft 52 with the shaft 53 of the driving motor 54.

The various shafts and operating parts are all carried by a suitable frame structure of any preferred design comprising generally, as here illustrated, an upright frame 55, preferably of the enclosed type, carrying a motor bracket 56 and other members arranged to support the various operating parts in requisite position.

The chain conveyor 42 is equipped at regularly spaced intervals with opposed clamping fingers 57 provided near their free ends with holding pads 58 of rubber or other suitable yielding material adapted to grip the outer surface of a golf ball and hold it in predetermined position until it is forcibly driven at right angles to the path of travel of the chain from between the holding pads.

The conveyor chain 42 and the conveyor 21 are driven in such timed relation that, as a ball approaches the top of the conveyor sprocket wheel 25, it is brought into registration with a pair of the holding pads 58. The ball, however, is not at this point positioned between the pads but is simply contacted thereby sufficiently to carry the ball upwardly around the sprocket wheel 41 as the feeding lug 22 passes downwardly around the sprocket wheel 25. A channel-shaped curved guard 59 extends partially around the sprocket wheel 41 and in such spaced relation to the sprocket chain 42 as to loosely accommodate a ball as it is being fed upwardly around the sprocket wheel by the fingers 57. The speed of the sprocket chain 42 is such that the ball within the guard 59 moves by centrifugal force outwardly against the guard during its upward travel, which movement is permitted by the separation of the opposed fingers 57 and pads 58 induced by the curvature of the wheel around which the chain is traveling, each finger 57 being fixed to a link of the chain so as to project at right angles to the path of travel of the link. It will be manifest that as the links pass around the sprocket wheel 41, the outer ends of the fingers 57 are separated one from the other so that the ball is very loosely held and is permitted to travel radially of the sprocket wheel under centrifugal force as far as is permitted by the guard 59. When the ball reaches the top of the sprocket wheel 41, it is induced by gravity to fall inwardly away from the guard, but at this point the fingers 57 are moved toward each other to firmly grip the ball between them and hold it at exactly a predetermined height. In this manner, each of the balls to be tested is accurately positioned and held between a pair of opposed, resilient pads so that when it reaches the driving station, it is positioned at exactly the proper height to be impacted by the driver. To insure against downward curving of the chain 42, which would cause a ball carried thereby to be lowered below the predetermined driving level, an accurately positioned supporting plate 61 extends beneath the upper lap of the chain, as illustrated in Fig. 2.

The driver, by which the balls are driven from their predetermined position between the holding pads 58 through the tube 8, comprises a disk 62 fixed on the shaft 52 and provided with a radially projecting hammer or head 63 equipped with a driving face 64 of suitable material. From Fig. 3 it will be observed that the horizontal axis of a ball 23 positioned between a pair of the holding pads 58 coincides approximately, if not exactly, with the arc in which the center of the driving head is traveling at the instant of impact of the head with the ball. By accurately positioning each ball between its holding pads, assurance is provided that each ball will be impacted by the driver at the same point on the ball, and since the driver is traveling at a constant linear velocity, the same momentum will be imparted to each ball when it is hit by the driver.

The motor 54 to which the driver is directly connected is of the three phase synchronous type operating at a constant speed of 1800 R. P. M. This insures a uniform linear velocity of the driving head and insures the delivery of a uniform driving impact to all balls properly positioned in the path of the driver. The timing of the travel of the chain 42 with respect to the driver is such that the driver when passing the chain at one revolution passes just ahead of the forward finger 57. On the next revolution, the driver impacts the center of the positioned ball, and on the next revolution passes behind the rear finger 57. This timing of the parts not only properly positions each ball to be driven, but also prevents the holding fingers and pads from being struck by the driver.

Since all of the balls are accurately hit with a uniform impact by the driver, it necessarily follows that any differences in the velocities of the driven balls must result from differences in their resiliencies. With our invention, these differences are determined during the first few feet of flight of the balls, by either measuring the actual velocity of each individual ball, or by determining the relative velocities of the balls and segregating them into groups corresponding with their determined relative velocities.

While we appreciate that various devices, mechanical or electrical, for accomplishing this purpose might be devised, we believe we are the first to accurately test the velocity of balls during their first few feet of travel in flight and therefore wish it to be understood that the specific apparatus herein disclosed for accomplishing these results is to be considered typical only of such devices, and as an exemplification of one suitable means in which the principles of our invention may be embodied.

Referrring first to the method of determining the actual linear velocity of a ball impelled through the tube by the driver, we position at the spaced apart stations 12 and 13 in the tube, devices adapted to be actuated by a ball as it passes these points. Since the two devices are substantially identical in structure and operation, a detailed description of one only will suffice, and for this purpose we have selected the device located at the station 13, and illustrated in Figs. 3 and 5 of the drawings. From Fig. 5 it will be observed that in a suitable frame interposed in the tube 8 we have mounted at opposite sides of the tube light reflectors or mirrors 65 and 66, and at one side above the mirror 65 a light projector 67, the structural details of which need not here be described. This projector projects an upper light beam 68 against the mirror 66 by which it is reflected along the line 69 against mirror 65 and then repeatedly reflected back and forth between the mirrors until it finally emerges as beam 71 into a light sensitive element PC2, a similar element PC1, Fig. 6, being provided at station 12. These elements are photo-electric cells of usual or preferred construction incorporated in an electrical circuit in which advantage is taken of the characteristic of such cells that their electrical resistance is materially increased when the light beam to which they are subjected is cut off.

It will be observed that each reflection of beam 68 until it finally emerges as beam 71 is always spaced from adjacent reflections a distance not greater than the diameter of a ball to be tested so that, irrespective of the position in the tube of a ball in flight, such ball as it passes the vertical plane of the light beams will always intercept one or more of the beams and thereby momentarily shut off the projection of light into the element PC2, thereby rendering the same active for the performance of its intended function.

Similar mirrors, a light projector, and a light sensitive element PC1 are embodied in the device interposed in the tube at the station 12 adjacent to the driving mechanism 7. When the projectors at the stations 12 and 13 are both in operation, the circuits, including the light sensitive elements, will be successively affected as the light rays are intercepted by the passage of a ball, and the time elapsing between the successive light beam interceptions at the stations 12 and 13 of the tube is utilized to indicate the actual linear velocity of the ball in its passage between stations 12 and 13. The circuit and indicator for making this determination of actual velocity will be described more in detail in connection with the wiring diagram of Fig. 6.

Since the linear velocity indicator requires an appreciable period of time to assume a position indicating the speed of a ball, and since an appreciable time is required also for the reading of the indicator, the balls cannot be fed through the apparatus in as rapid succession when their actual linear velocity is being determined as they can when their relative velocities only are to be determined. Therefore, when the apparatus is used for determining actual linear velocity, some of the pockets 17 in the disk 16 by which the balls are fed from the magazine 15 may be plugged or closed to increase the length of time between the feeding of successive balls to the apparatus, or, if preferred, the balls may be dropped into the magazine singly at spaced time intervals. When the apparatus is to be used for determining relative ball velocities and for sorting or segregating the balls into groups of like velocities, the balls will be delivered from the magazine to the apparatus at intervals of approximately two seconds.

Irrespective of whether actual or relative velocities are being determined, the driven balls are delivered at high speed from the right hand end of the tube 8 viewing Fig. 1, into a velocity reducer or dissipator 14 which, as will be apparent from Fig. 4, comprises a series of barriers 73, 74, 75, 76 and 77 so disposed that a ball impinges against the barriers in the order given by reason of being deflected from one barrier to the next. Each barrier comprises a resilient pad 78 of soft rubber or other suitable material covered by a facing 79 of fabric or other durable material adapted to receive the successive impacts of the balls without destruction or marked deterioration.

At each deflection by a barrier, the ball gives up some of its energy until it finally drops by gravity into the upper end of the delivery tube 81. One side of this tube is provided with a plurality of openings 82 registering with corresponding delivery chutes 83, 84, and 85, respectively, each adapted to deliver into a different receptacle or compartment in which the balls are collected. The lower end of the tube 81 also discharges into still another receptacle or compartment. Opposite each opening 82, the tube 81 is provided with a switch or deflector plate 86 hinged at its upper end, as indicated at 87, so that when the plate is swung to the right viewing Fig. 4 a ball entering tube 81 will be diverted into the oppositely positioned delivery chutes 83, 84, or 85, as the case may be. The deflecting plates 86 are adapted to be individually actuated by corresponding electro-magnetic devices 88, 89, and 90, respectively. Each device comprises a solenoid and a movable core adapted, upon energization of the solenoid, to project the switch plate 86 into the tube 81. Upon de-energization of a solenoid, the parts are restored to normal position shown in Fig. 4 by a light coiled spring 80 surrounding an extension of the solenoid core.

When the apparatus is employed for determining relative ball velocities and for sorting the balls into groups of like velocities and without the determination of the actual linear velocity of a ball, the first light sensitive element and its projector, that is the element PC1 and the projector located at station 12, are switched out of operation, and only the element PC2 and projector located at station 13 are employed. The general mode of operation for this purpose will now be explained, and the details of the circuits involved will be described later.

Speaking generally, the constant speed motor shaft 53 is equipped with a disk or cylinder 91 (Figs. 2 and 6) of insulating material provided with an arcuate, metallic sector 92. For adjustment or regulating purposes, the sector may be adjustable circumferentially of the cylinder, or the cylinder may be adjustably mounted on the motor shaft. Brushes 93, 94, 95 and 96 are positioned to contact the sector at each revolution of the shaft. Since the constant speed ball driving head is in fixed adjusted relation to the sector 92, and the light sensitive element PC2 at station 13 is located a fixed distance from the point of impact of the driving head with a ball, the relative times at which the light sensitive element PC2 will be de-energized by the interruption of the light beam and the various brushes will contact the sector 92 will be dependent upon the velocity of the driven ball. For instance, if the light beam at station 13 is interrupted when brushes 93 and 95 only are in contact with sector 92, solenoid 90 will be energized to divert the ball into chute 85. Should the speed of the driven ball be sufficiently slower, so that all the brushes 93, 94, 95, and 96 will be in contact with sector 92 at the instant of interruption of the light beam, the circuits thus established will energize solenoid 89 to divert the ball into chute 84. Should the velocity of the ball be still less, brushes 94 and 96 only will be contacting sector 92 at the instant of interruption of the light beam, and the circuit thus established will energize solenoid 88 to divert the ball into chute 83. If the speed of the ball should be either sufficiently greater or less than above indicated so that none of the brushes would be in contact with the sector 92 at the instant of interruption of the light beam, none of the solenoids would be energized, and the ball would in consequence be delivered at the lower end of the tube 81.

The speed or velocity of the driven balls is therefore utilized through the medium of electric circuits to sort or segregate the balls into groups of like velocities. In the present instance, they are divided into three groups, all within the contemplated velocity range of the apparatus and those balls, if any, having a velocity and a resultant coefficient of resiliency outside the range provided for, are collected in a fourth group.

Referring now to the wiring diagram of Fig. 6, those circuits will first be considered which are employed in determining the actual linear velocity of a particular ball. For such a measurement both of the photo-electric cells PC1, PC2 are employed, the increase in resistance of respective ones of these cells, incident to a diminution of the light falling on them, being used to change the grid bias on respective amplifier tubes 100, 101. For this purpose each cell is connected across a battery 102 and in series, respectively, with resistors 103, 104, which may be of about five megohms. One terminal of each of these resistors is connected to the cathode 105, 106 of its associated amplifier tube through a small bias battery 107, 108, while the other resistor terminal is, in each case, connected to the grid 109, 110 of its associated amplifier through smaller resistors 111, 112 of about two megohms. Accordingly, the decrease in voltage drop across the respective resistors 103, 104 (resulting from a diminution in current through them when their respective cell's internal resistance increases as light on it is diminished) is used to change the biasing potentials on the corresponding ones of the grids 109, 110 to diminish the output currents of the corresponding amplifier tubes 100, 101 practically to zero. These amplifier tubes are preferably high-mu tubes and may be type 6F5G triodes. The desirable high degree of sensitivity of such high-mu tubes is accompanied by fairly low current carrying capacity, and, consequently, they are used to control, in turn, tubes of higher current rating, as will appear below. In the output circuits of the amplifiers a load resistor 113 of approximately 65,000 ohms is connected between the plate 114 and cathode 105 of the first amplifier 100 while a similar load resistor 115 is connected between the plate 116 and cathode 106 of the other amplifier 101. A milliammeter 117 is arranged to be connected through a reversing switch 118 to measure the output currents.

The outputs of the amplifiers 100, 101 are utilized, respectively, to control the biasing potentials on the control grids of gaseous discharge vacuum tubes 120, 121, that is, the higher current rating tubes mentioned above. These latter may be type 2051 tetrodes. Thus the tube 120 includes a plate 122, a cathode 123 connected to a screen grid 124, and a control grid 125. Similarly, the tube 121 includes a plate 126, a cathode 127 connected to a screen grid 128, and a control grid 129. Plate voltage for the tubes 120, 121 is supplied from terminals 130, 131 to which a suitable source of direct current potential is connected with a resistor 132 and condenser 133 across these terminals. Incidentally, all of the vacuum tubes in the circuit are of the indirectly heated cathode type and since their cathode heaters, as well as the supply circuits therefor, are of conventional form, neither have been shown.

The control grid 129 of the tube 121 is permanently connected to a terminal of the load resistor 115 of the corresponding amplifier tube 101 through a resistor 134, while the control grid 125 of the other tube 120 may be connected through a resistor 135 and a two-position selector switch 136 with either the output circuit of the amplifier 100 or with the output of the other amplifier 101. Thus when the selector 136 is in the position shown the photo-electric cells PC1, PC2 are effective through the medium of their respective amplifiers 100, 101 to control the outputs of the respective gaseous discharge tubes 120, 121, but when the selector 136 is thrown to its other position the photo-electric cell PC2 alone controls the output of both of the gaseous discharge tubes through its amplifier tube 101. Load resistors 113 and 115 are paralleled by condensers 137 and 138.

A ballistic galvanometer 139 of conventional form serves as an indicating device for the system when velocity measurements are being made. This galvanometer has the usual mirror, not shown, arranged to swing through a distance dependent upon the length of time that voltage is applied to the instrument and the scale, not shown, is calibrated in terms of feet per second or other linear speed. The resistors 140, 141 are connected in shunt and series respectively with the galvanometer, while it is connected across a resistor network of the potentiometer type including a resistor 142 across the instrument and resistor sections 143, 144, 145, 146 and 147 connected in series with each other and in parallel with the resistor section 142. The section 145 comprises an adjustable potentiometer arm. Three terminals 148, 149, 150 are provided on the network and to which input current is supplied.

A selector switch 151 serves, in conjunction with the selector switch 136 heretofore noted, to condition the circuits alternatively for either the velocity type or comparative type of measurements heretofore generally described. The selector switch 151 is of the rotary type and comprises four stationary segments 152, 153, 154 and 155 as well as four corresponding sliding brushes 156, 157, 158, 159 riding over these segments to connect them to one or the other of respective ones in two stationary sets of contact points 160, 161, 162, 163 and 164, 165, 166, 167. In the position of the selector 151 shown, the first of these sets of contacts, namely 160, 161, 162, 163, is connected to respective ones of the stationary segments to condition the circuits for measurement of ball velocity.

With the selectors 136 and 151 set as shown the circuit is conditioned for measurement of ball velocity. Thus a ball moving through the tube 8 (see Fig. 1) first of all diminishes light passing to photo-electric cell PC1 at station 12. Thereupon the output current of the amplifier 100 (Fig. 6) is decreased to such a point that the voltage drop across its load resistor 113 becomes negligible and in view of this condition the control grid 125 of the gaseous discharge tube 120 is at the potential of its cathode 123 so that the tube ionizes and becomes conductive. Thereupon current flows in its plate or output circuit to set up a voltage drop through a portion of the resistor network across which the ballistic galvanometer is connected so as to actuate the latter (through a circuit 122—170—153—157—161—171—150—146—145—149—172—131—130—173—123). As the ball, whose velocity is being measured, moves on down the tube 8 it next momentarily diminishes the light falling on the second photo-electric cell PC2 at station 13. This in turn causes the output of the amplifier tube 101 to be diminished so that the drop across its resistor 115 is negligible, whereupon the associated gaseous discharge tube 121 is ionized and becomes conductive to supply current in its output circuit through a second portion of the potentiometer network of the ballistic galvanometer 159 (through a circuit 126—174—152—156—160—175—148—146—145—149—172—131—130—173—127). This second impulse applies to the galvanometer resistor network is in voltage opposition to the first, and accordingly, the mechanical impulse to the galvanometer movement is arrested. Thus the deflection of the galvanometer indicates the time required for the ball to pass from station 12 to station 13, and since the scale of the galvanometer 139 is calibrated in terms of linear speed, a precise reading is given of the velocity of the ball. During such velocity measuring the brush 156, through contact with point 162, closes a circuit including a pilot light which visually indicates to the operator that the machine is set to measure the velocities of the individual balls. When the machine is employed to segregate balls into groups based on velocities, the brush 156 contacts point 166 to close a circuit including another pilot light, which indicates that the machine is set for segregation purposes.

The control apparatus shown in Fig. 6 also includes additional apparatus used during the segregating or sorting operation of the machine, to control the three solenoids 88, 89 and 90 heretofore described. This additional apparatus comprises a pair of relays $R_1$ and $R_2$ as well as vacuum tubes 180 and 181 to hold the corresponding relays $R_1$, $R_2$ closed once they have been picked up. The relay $R_1$ includes an actuating winding $RW_1$ and two sets of normally open contacts 182, 183 as well as a normally closed set of contacts 184. Similarly the relay $R_2$ includes an actuating winding $RW_2$, a set of normally open contacts 185 and a set of normally closed contacts 186. The tubes 180, 181 may, like the tubes 120, 121, be type 2051 gaseous discharge tetrodes. Thus the tube 180 includes a plate 187, a screen grid 188 connected to its cathode 189, and a control grid 190 connected with the cathode through a condenser 191 and connected to it through a bias battery 191' in series with grid current-limiting resistor 192 and biasing resistor 193. Similarly, the other tube 181 includes a plate 194, a screen grid 195 connected to a cathode 196, and a control grid 197 connected to the cathode through a condenser 198 and connected to it through a bias battery 199, grid current-limiting resistor 200 and biasing resistor 201. Plate current may, for circuit testing purposes, be supplied to the tubes 180, 181 from the source at terminals 130, 131 through a normally open manual switch 202, but in normal operation the current is supplied through a normally closed manual switch 203 and a cam-operated recycling switch 204, which opens during each revolution of the rotating disk 16 (Fig. 1) for a purpose which will appear below. Energizing current for the three solenoids 88, 89, 90 is supplied from a suitable source of current connected to terminals 205, 206.

To condition the apparatus for sorting operation, the selector switches 136 and 151 are shifted to their alternative positions from those shown in Fig. 6. Thus the selector 136 connects both of the tubes 120, 121 to have their grids controlled from the single photo-electric cell PC2 through the medium of its amplifier tube 101, while the selector 151 cuts the galvanometer 139 out of circuit and cuts the relays $R_1$, $R_2$ into circuit for control by the tubes 120, 121. With the selectors so set, when a ball moves down the tube 8 past the photo-electric cell PC2 cutting off the light to it momentarily, the output of its amplifier 101 is diminished so that the gaseous discharge tubes 120, 121 become conductive. The position of the revolving cylinder 91 has been so set that if the ball is of a desired average speed all four of the brushes 93, 94, 95, 96 will be in contact with the segment 92 at the instant the tubes 120, 121 become conductive. As a consequence the relay $R_1$ is energized from the tube 121 (through a circuit 126—174—152—156—164—205—$RW_1$—206—193—207—95—92—93—208—167—159—155—209—204—203—210—131—130—173—127) while the other relay $R_2$ is energized from the other tube 120 (through a circuit 122—170—153—157—165—211—$RW_2$—212—201—213—96—92—94—208—167—159—155—209—204—203—210—131—130—173—123). Normally, the tubes 180, 181 are non-conductive because of the potential applied to their control grids by the respective biasing batteries 191, 199. It will be observed, however, that in the relay circuits set out just above, the resistors 201 and 193 are included. The resultant voltage drops through these later resistors changes the grid bias on the tubes 180, 181, rendering them conductive. The tube 180 is connected in the circuit of the relay $R_1$ so that its output terminals (cathode and plate) are, in effect, in shunt with the rotating contact device 91, and similarly the output of the other tube 181 is connected in shunt with this contact device in the supply circuit of the other relay $R_2$. Accordingly, when once picked up these relays will remain energized by the tubes 180 and 181, respectively, until the plate circuits of the latter are interrupted by opening of the cycling switch 204 to drop the relays out and condition the circuits for the next cycle of operation.

When both of the relays $R_1$, $R_2$ are energized as described above the relay $R^1$ closes its contacts 183 (its other contacts 182 which are closed being ineffective at the moment) and the relay $R_2$ closes its contacts 185, thereby energizing the solenoid 88 to deliver the ball through the associated chute 83 as heretofore described.

In the event that a ball is traveling through the tube 8 somewhat faster than the average speed noted above, only the brushes 95, 93 will be in contact with the segment 92 at the instant the tubes 120, 121 become conductive. It will be seen that in such case the circuit of the relay $R_2$ will be open at 96, 92 so that only the relay $R_1$ is energized through its circuit heretofore noted. Accordingly, the solenoid 90 is energized (through contacts 182 on the relay $R_1$ and normally closed contacts 186 on the relay $R_2$) thereby causing the ball to be delivered through its associated chute 85. On the other hand, if the ball is traveling somewhat slower than the normal rate first assumed above, the cylinder 91 will have turned so far that only the brushes 94, 96 are bridged by the segment 92. In such case the relay $R_1$ remains de-energized, its circuit being interrupted at 95, 92, but the other relay R₂ is picked up. As a consequence, the third solenoid 89 is energized (through contacts 185 on the relay R₂ and normally closed contacts 184 on the relay R₁) and diverts the ball into the associated delivery chute 84.

In the event that the ball is traveling so fast or so slow that none of the brushes 93 to 96 are in contact with the segment 92 at the instant that the tubes 120, 121 are rendered conductive by the photo-electric cell PC2, neither of the relays R₁ or R₂ will be energized nor will any of the solenoids 88, 89, 90. Consequently, the ball will be delivered at the lower end of the outlet tube 81 in the delivery system as heretofore noted.

It will be apparent from the foregoing that we have provided an apparatus which is capable of determining with accuracy the actual linear velocity of a ball during its first few feet of flight, and is also capable of determining the relative velocities of a series of successively driven balls, and of segregating such balls into groups corresponding with the determined velocities of the balls. While the apparatus illustrated is designed to sort the balls into three groups within a predetermined velocity range and to segregate into another group all balls following outside said range, it should be understood that the number of groups or classifications into which the balls may be divided may be increased or diminished as desired within the preview of our invention.

Furthermore, various modifications of the apparatus shown and described may be resorted to without departing from the essence of our invention as defined in the following claims.

We claim:

1. In an apparatus of the character described, the combination of a driving element, means for actuating said element at a predetermined linear velocity, means for positioning a ball in the path of said driving element whereby the ball is driven, means for projecting a light beam across the path of the driven ball, a light-sensitive device rendered operable upon the interception of said beam by said ball, and means under the joint control of said device and the means for actuating the driving member adapted to be actuated in accordance with the velocity of the driven ball.

2. In an apparatus of the character described, the combination of a rotatable driving member, means for rotating said member at a predetermined speed, means for positioning balls in succession in position to be driven by said member, means for projecting a light beam in the path of the driven balls, a light-sensitive device rendered operable upon interception of said beam by a ball, and an operative device controlled by the position of said driving means at the instant of said light beam interception so as to operate in accordance with the velocity of the ball effecting the light beam interception.

3. In an apparatus of the character described, the combination of means for delivering a predetermined uniform impact to each of a series of balls to be tested, a tube through which said balls travel in flight, means for projecting a series of light beams across said tube in a plane transverse to the axis thereof, the spacing between adjacent beams being less than the diameter of the balls being tested, and means rendered operable by the interception of a beam by a ball in conjunction with the actuation of said impact delivering means to classify each driven ball in accordance with its velocity through said tube.

4. In a testing apparatus, the combination of a tube, means for projecting a series of balls in succession through said tube, means for projecting a light beam transversely of the tube, means for reflecting said beam back and forth across the tube to produce a series of beams in a plane transverse to the axis of the tube spaced apart less than the diameter of the projected balls so that a beam will be intercepted by each projected ball, and means rendered operable by the interception of a beam in conjunction with an electric circuit operating synchronously with said projecting means for classifying the projected balls according to their velocities.

5. In a ball testing apparatus, the combination of a driver, means for actuating said driver in a predetermined path and at a predetermined velocity, an endless conveyor, ball holding clamps comprising spaced fingers carried by said conveyor, means for positioning a ball in a predetermined position in said clamps, and means for actuating said conveyor in predetermined timed relation with the driver to locate said ball in the path of travel of said driver.

6. In a ball testing apparatus, the combination of a driver, means for rotating said driver at a predetermined linear velocity, a conveyor, a ball clamping and holding device comprising a pair of spaced fingers provided with opposed holding pads carried by said conveyor, means for positioning a ball in predetermined position in said clamping and holding device, and means for operating the conveyor in timed relation with the driver to locate the positioned ball in the path of said driver.

7. In a ball testing apparatus, the combination of a rotatable driver, a conveyor, ball clamping and holding means carried by the conveyor, a sprocket wheel around which said conveyor is trained, said clamping means being opened during the travel thereof in an arc around said sprocket wheel, means for delivering a ball to said clamping means, a guard cooperating with said clamping means to locate the ball in predetermined position in said clamping means, and means for driving the conveyor in timed relation with said driver to present said positioned ball in the path of the driver.

8. In an apparatus of the character described, the combination of a tube, means located at one end of the tube for driving balls singly through said tube, means at the other end of the tube for receiving the driven balls, means for projecting a light beam across the path of travel of balls through said tube, light sensitive means adapted to be actuated upon the interception of said light beam, an electric circuit including a contact arranged to be opened and closed in synchronism with a predetermined position of said ball driving means and means controlled jointly by said light sensitive means and said contact whereby the relative velocities of balls intercepting said light beam may be ascertained.

9. In an apparatus of the character described, the combination of means for projecting in succession a series of balls, means for projecting a light beam across the path of said balls so as to be intercepted by the passage of a ball in flight at a predetermined distance from the point of projection, and means controlled jointly by said light beam and by the projecting means for segregating the projected balls in accordance with variations in their velocities in flight.

CARL G. ANDERSON.
DONALD E. RICHARDSON.